United States Patent
Kumar (10) Patent No.: US 9,912,164 B2
(45) Date of Patent: Mar. 6, 2018

(54) MULTISOURCE POWER DELIVERY SYSTEM

(71) Applicant: Intel Corporation, Santa Clara, CA (US)

(72) Inventor: Pavan Kumar, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 121 days.

(21) Appl. No.: 14/582,969

(22) Filed: Dec. 24, 2014

(65) Prior Publication Data

US 2016/0190813 A1    Jun. 30, 2016

(51) Int. Cl.
*H02J 5/00*    (2016.01)
*H02J 7/00*    (2006.01)
*H02M 3/158*   (2006.01)

(52) U.S. Cl.
CPC .............. *H02J 5/00* (2013.01); *H02J 7/0016* (2013.01); *H02J 7/0068* (2013.01); *H02M 3/158* (2013.01); *H02M 3/1582* (2013.01); *H02J 2007/0059* (2013.01)

(58) Field of Classification Search
CPC ............................. H02M 3/158; H02M 3/156
See application file for complete search history.

(56) References Cited

U.S. PATENT DOCUMENTS

| | | | |
|---|---|---|---|
| 5,959,368 A * | 9/1999 | Kubo | H02J 1/102 307/18 |
| 7,928,691 B2 * | 4/2011 | Studyvin | H02J 7/0018 307/43 |
| 8,816,532 B2 * | 8/2014 | Shih | H02J 1/102 307/43 |
| 2008/0239772 A1 * | 10/2008 | Oraw | H02M 3/07 363/60 |
| 2010/0026100 A1 | 2/2010 | Teggatz et al. | |
| 2010/0208501 A1 | 8/2010 | Matan et al. | |
| 2011/0215760 A1 | 9/2011 | Lammeren | |
| 2011/0278931 A1 | 11/2011 | Johnson, Jr. | |
| 2012/0194138 A1 * | 8/2012 | Uno | H01M 10/44 320/119 |
| 2013/0015805 A1 | 1/2013 | Teggatz et al. | |
| 2013/0108898 A1 * | 5/2013 | Potts | H02J 7/0013 429/50 |

OTHER PUBLICATIONS

International Search Report and Written Opinion from related application PCT/US2015/063864 dated May 4, 2016.
International Preliminary Report on Patentability and Written Opinion, issued in PCT Application No. PCT/US2015/063864, dated Jul. 6, 2017, 9 pages.
Taiwanese Office Action issued in Taiwanese Application No. 104138742, dated Apr. 6, 2017, with English translation, 9 pages.
Taiwanese Office Action and Search Report issued in Taiwanese Application No. 104138742, dated Nov. 16, 2016, with English translation of Search Report.

* cited by examiner

Primary Examiner — Daniel Kessie
(74) *Attorney, Agent, or Firm* — Grossman Tucker Perreault & Pfleger PLLC (57) ABSTRACT

One embodiment provides an apparatus. The apparatus includes a plurality of storage elements coupled in series. The storage elements are to capture and store energy received from a plurality of sources. The apparatus further includes a balancer coupled to the plurality of storage elements. The balancer is to balance energy drawn from each storage element.

17 Claims, 3 Drawing Sheets

MULTISOURCE POWER DELIVERY SYSTEM

FIELD

The present disclosure relates to power delivery, in particular to, a multisource power delivery system.

BACKGROUND

Computing devices typically receive energy from a single power source, for example, a battery or a power supply. The battery may also receive energy from a battery charger. The battery charger or power supply may receive AC (alternating current) input and provide a DC (direct current) output to the battery or to the computing device, respectively. Energy received from the single power source may then be converted to one or more voltages by power conversion logic within the computing device. The power conversion logic may be configured to supply energy, at one or more operating voltage(s), to selected elements of the computing device.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Generally, this disclosure relates to multisource power delivery systems (and methods). A multisource power delivery system may include a plurality of power sources ("sources"), conventional and/or unconventional, and a power device that includes a balancer and a plurality of storage elements. The power device is configured to receive energy from the plurality of sources and to store energy from each source in a respective storage element. The plurality of storage elements are configured to be coupled to each other in series and each storage element is configured to be coupled to the balancer. The balancer includes one or more voltage regulators and/or DC-to-DC converters configured to balance energy drawn from each of one or more of the storage elements. The power device is configured to provide energy at a plurality of balanced voltages ("output voltages") to a plurality of taps. A number of output voltages (and number of taps) may be less than or equal to a number of sources. One or more of the taps may then be coupled to a load device.

Conventional sources include, but are not limited to, battery chargers, AC (alternating current)/DC (direct current) converters, USB (Universal Serial Bus) ports, etc. Conventional sources may generally be configured to provide energy at voltages on the order of ones or tens of volts, for example, 5, 12 and/or 20 volts. Unconventional sources include solar cells, photovoltaic cells, wireless power sources configured to capture and convert energy from antennas, piezoelectric sources configured to convert vibration into electrical energy, thermoelectric sources configured to convert heat flow across a temperature gradient into electrical energy, etc. Unconventional sources may provide energy at voltages on the orders of ones and/or tenths of a volt. Storage element(s) coupled to respective unconventional source(s) may each be configured to receive and store energy at voltage(s) on the order of ones and/or tenths of a volt.

Operating voltage(s) of at least some elements (e.g., loads) of the load device may be in the range of 0.5 volt to 5 volts. For example, operating voltages of elements of a computing device may include 5, 3.3, 1.8, 1.5, 1.3 and/or 0.8 volts. Power device output voltages greater than the output voltages of individual unconventional sources may be provided by coupling to a plurality of storage elements that are coupled in series. Power device output voltage(s) may then be provided to, for example, a computing device, with little, if any, conversion. Converting a first voltage to a second voltage when the first and second voltage are relatively close in value is generally more efficient than converting the first voltage to the second voltage when the first voltage is relatively much larger or relatively much smaller than the second voltage. Thus, relatively closely matching output voltages from unconventional sources to operating voltage(s) of loads included in a load device with relatively minimal conversion may be more efficient than converting output voltages of the conventional power sources due to large relative voltage differences.

Figure 1:
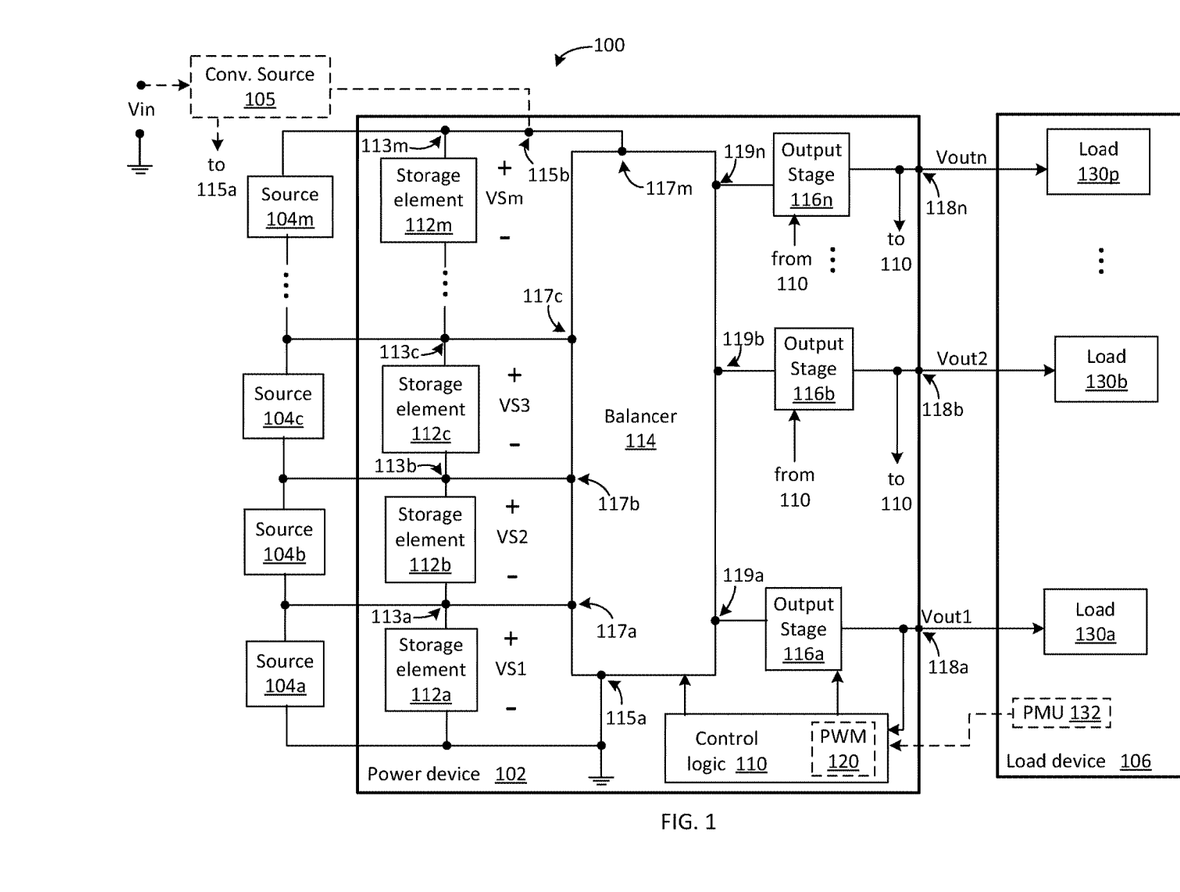
FIG. 1 illustrates a functional block diagram of a multisource power delivery system and load device consistent with various embodiments of the present disclosure.

FIG. 1 illustrates a system block diagram of a multisource power delivery system 100 and load device 106 consistent with several embodiments of the present disclosure. Load devices, e.g., load device 106, may include, but are not limited to, computing devices (e.g., a server, a workstation computer, a desktop computer, a laptop computer, a tablet computer (e.g., iPad®, GalaxyTab® and the like), an ultraportable computer, an ultramobile computer, a netbook computer and/or a subnotebook computer); a mobile telephone including, but not limited to a smart phone, (e.g., iPhone®, Android®-based phone, Blackberry®, Symbian®-based phone, Palm®-based phone, etc.) and/or a feature phone; a wearable device and/or system; and/or sensor(s) and/or a sensor network (wired and/or wireless), etc.

Load device 106 may include a plurality of loads 130a, 130b, ..., 130p. The loads 130a, 130b, ..., 130p may include, but are not limited to, circuitry (analog and digital), logic, voltage regulator(s), DC-to-DC converter(s) and/or power rail(s), etc. One or more of load(s) 130a, 130b, ..., and/or 130p are configured to receive energy from multisource power delivery system 100 at one or more input voltage(s). In some embodiments, load(s) 130a, 130b, ..., and/or 130p may be configured to utilize the supplied energy without converting a received input voltage. In some embodiments, load(s) 130a, 130b, ..., and/or 130p may correspond to voltage regulator(s). For example, the voltage regulators may correspond to linear and/or low drop out voltage regulators when the input voltage(s) are relatively near operating voltage(s) of load device elements that are coupled to the voltage regulators.

Load device 106 may further include a performance monitoring unit (PMU) 132. PMU 132 may be configured to monitor operation of load device 106 and to provide an indication, e.g., a signal, to system 100, related to changes in, and/or anticipated energy consumption of, load device 106 and/or loads 130a, 130b, . . . , 130p, as described herein.

System 100 includes a power device 102 and a plurality of sources 104a, 104b, 104c, . . . , 104m. Sources 104a, 104b, 104c, . . . , 104m may include conventional and/or unconventional power sources, as described herein. In some embodiments, system 100 may include a conventional power source 105. Conventional source 105 may correspond to an AC/DC converter (i.e., battery charger) that may be coupled to an AC supply with supply voltage, Vin. Conventional source 105 may be coupled to power device 102. Conventional source 105 is configured to provide energy to power device 102 in addition to, and/or as an alternative to, sources 104a, 104b, 104c, . . . , 104m, for example, when sources 104a, 104b, 104c, . . . , 104m correspond to unconventional sources.

Power device 102 includes control logic 110, a plurality of storage elements 112a, 112b, 112c, . . . , 112m and a balancer 114. Power device 102 may further include a plurality of output stages 116a, 116b, . . . , 116n. Power device 102 is configured to receive electrical energy from one or more of source(s) 104a, 104b, 104c, . . . , and/or 104m and/or conventional source 105.

Conventional source 105 is configured to couple to balancer 114 and the plurality of storage elements 112a, 112b, 112c, . . . , 112m at nodes 115a and 115b. For example, conventional source 105 may be configured to provide energy to balancer 114 and the plurality of storage elements 112a, 112b, 112c, . . . , 112m when one or more of sources 104a, 104b, 104c, . . . , and/or 104m is not available.

The energy received from one or more of sources 104a, 104b, 104c, . . . , 104m may be provided to respective storage elements 112a, 112b, 112c, . . . , 112m and may be at respective input voltages VS1, VS2, VS3, . . . , VSm. Power device 102 is configured to provide energy out at respective power device tap(s) 118a, 118b, . . . , 118n. Output voltage(s) Vout1, Vout2, . . . , Voutn, measured between an associated tap and ground, are related to one or more of the input voltage(s) VS1, VS2, VS3, . . . , and/or VSm. For example, Vout1 may correspond to VS1. In another example, Vout2 may correspond to a sum of VS1, VS2 and VS3. In another example, Voutn may correspond to a sum of VS1, VS2, VS3, . . . , and VSm. A number of taps and, therefore the number of output voltages Vout1, Vout2, . . . , Voutn, is less than or equal to a number of input voltages VS1, VS2, VS3, . . . , VSm. The number of input voltages corresponds to the number of storage elements 112a, 112b, 112c, . . . , 112m and may also correspond to the number of sources 104a, 104b, 104c, . . . , 104m.

Control logic 110 is configured to manage operations of power device 102. For example, control logic 110 may be configured to receive the indication (e.g., signal) from PMU 132 related to operation of load device 106. Control logic 110 is configured to manage one or more of balancer 114 and/or output stages 116a, 116b, . . . , 116n in response to the indication, as described herein.

The storage elements 112a, 112b, 112c, . . . , 112m may include rechargeable batteries, capacitors and/or supercapacitors. Rechargeable batteries may include one or more rechargeable battery types. Rechargeable battery types may include, but are not limited to, Li-ion (Lithium Ion), NiMH (Nickel-Metal Hydride), NiZn (Nickel-Zinc), NiCd (Nickel-Cadmium), etc. Supercapacitors may include double-layer capacitors (e.g., electrostatic charge storage), pseudocapacitors (e.g., electrochemical charge storage) and hybrid capacitors (e.g., both electrostatic and electrochemical charge storage).

Supercapacitor operational characteristics may be between corresponding operational characteristics of conventional capacitors and rechargeable batteries. For example, supercapacitors may have a higher energy density and a lower power density compared to conventional capacitors. In other words, supercapacitors may store more energy per unit volume and may charge and discharge more slowly than conventional capacitors. Supercapacitors have lower energy density and a higher power density relative to rechargeable batteries. In other words, supercapacitors may store less energy than rechargeable batteries but may discharge faster, i.e., may have a relatively smaller time constant, than rechargeable batteries. Thus, when combined with rechargeable batteries, supercapacitors may complement the rechargeable batteries by providing additional energy over a relatively short time period (i.e., relatively fast discharge).

Each storage element 112a, 112b, 112c, . . . , 112m may thus include one or more rechargeable batter(ies), capacitor(s) and/or supercapacitor(s) that may be coupled in series and/or in parallel. The specific arrangement may be configured to provide a target (i.e., specified) energy capacity at an input voltage VS1, VS2, VS3, . . . , VSm. Each input voltage VS1, VS2, VS3, . . . , VSm is related to and may correspond to an output voltage of a respective associated source 104a, 104b, 104c, . . . , 104m coupled to the storage element 112a, 112b, 112c, . . . , 112m.

The storage elements 112a, 112b, 112c, . . . , 112m may be coupled in series. For example, a first port (e.g., negative terminal) of storage element 112a may be coupled to ground, a second port (e.g., positive terminal) of storage element 112a may be coupled to a first port of storage element 112b at node 113a, a second port of storage element 112b may be coupled to a first port of storage element 112c at node 113b, and so on until a second port of storage element 112m that may be coupled to node 113m. For example, each storage element 112a, 112b, 112c, . . . , 112m may correspond to a stack when voltages VS1, VS2, VS3, . . . , VSm equal (e.g., to a voltage VS). Continuing with this example, a respective output voltage Vout1, Vout2, . . . , Voutn may then correspond to VS multiplied by a respective whole number factor, e.g., s*VS, where s is a whole number between 1 and m, inclusive. Since there may be fewer output voltages than stacks, s may or may not take every value between 1 and m.

Each source 104a, 104b, 104c, . . . , 104m may be coupled in parallel to a respective storage element 112a, 112b, 112c, . . . , 112m. For example, source 104a may be coupled in parallel with storage element 112a, source 104b may be coupled in parallel with storage element 112b and so on through source 104m and storage element 112m. Thus, a number of sources 104a, 104b, 104c, . . . , 104m may equal a number of storage elements 112a, 112b, 112c, . . . , 112m. The sources 104a, 104b, 104c, . . . , 104m may then be effectively coupled in series. The storage elements 112a, 112b, 112c, . . . , 112m (and sources 104a, 104b, 104c, . . . , 104m) may be further coupled to the balancer 114. For example, the first port of storage element 112a may be coupled to balancer port 115a that is also coupled to ground. Each node 113a, 113b, 113c, . . . 113m (and thus each storage element second port) may be coupled to respective balancer input ports 117a, 117b, 117c, . . . , 117m. Respective input voltages VS1, VS2, VS3, ..., VSm may then be provided across adjacent balancer input ports. Thus, balancer 114 is coupled to the sources 104a, 104b, 104c, ..., 104m and storage elements 112a, 112b, 112c, ..., 112m at balancer input ports 117a, 117b, 117c, ..., 117m via nodes 113a, 113b, 113c, ..., 113m.

Balancer 114 is configured to receive energy from the sources 104a, 104b, 104c, ..., 104m and/or storage elements 112a, 112b, 112c, ..., 112m. Balancer 114 may further receive energy from unconventional source 105. Balancer 114 is further configured to provide energy to balancer output ports 119a, 119b, ..., 119n. One or more of balancer output ports 119a, 119b, ..., 119n may be coupled to respective output stages 116a, 116b, ..., 116n. Output voltages at ports 119a, 119b, ..., 119n may generally be referenced to ground, e.g., port 115a. Thus, the output voltages at ports 119a, 119b, ..., 119n may correspond to a composite (i.e., sum) of voltages across one or more storage element(s) 112a, 112b, 112c, ..., 112m. For example, the output voltage associated with port 119a may correspond to the voltage associated with storage element 112a and/or source 104a, e.g., VS1. In another example, the output voltage associated with port 119b may correspond to a sum of, for example, the voltages across storage elements 112a, 112b and 112c, e.g., VS1+VS2+VS3.

Balancer 114 is configured to balance energy drawn from the storage elements 112a, 112b, ..., and/or 112m and/or sources 104a, 104b, 104c, ..., and/or 104m when current is drawn from one or more of ports 119a, 119b, ..., 119n. A number of balancer output ports 119a, 119b, ..., 119n may be less than or equal to a number of storage elements 112a, 112b, 112c, ..., 112m. Balancer 114 is configured to control a relative amount of energy drawn from each storage element 112a, 112b, 112c, ..., and/or 112m and/or source 104a, 104b, 104c, ..., and/or 104m that are coupled to balancer 114. For example, balancer 114 may include one or more voltage regulator(s) and/or DC-to-DC converter(s). Unless otherwise noted, as used herein the term "voltage regulator" corresponds to both voltage regulators and DC-to-DC converters and thus "voltage regulator" is understood to mean voltage regulator and/or DC-to-DC converter. Voltage regulator(s) (and/or DC-to-DC converters) may include, but are not limited to, switched capacitor voltage regulators, buck voltage regulators, buck-boost voltage regulators, etc. The voltage regulator(s) may be configured to provide an output voltage greater than, less than or equal to a corresponding input voltage. The voltage regulator(s) may be configured to operate open loop (i.e., without direct output voltage feedback) and/or in a closed loop (i.e., with direct output voltage feedback) so that an amount of energy drawn from each storage element 112a, 112b, 112c, ..., and/or 112m is balanced.

For example, balancer 114 may be configured to receive a pulse width modulated (PWM) signal input from control logic 110 and PWM 120. The PWM signal may have a frequency on the order of one hundred kilohertz, ten Megahertz (MHz) or one hundred MHz. The PWM duty cycle may be selected based, at least in part, on relative values of respective output voltages of sources 104a, 104b, 104c, ..., 104m, e.g., VS1, VS2, VS3, ..., VSm. The associated balancer 114 output voltage(s) may decrease as energy is drawn from the storage elements 112a, 112b, 112c, ..., 112m and not replenished by, e.g., respective sources 104a, 104b, 104c, ..., 104m and/or conventional source 105. The decrease(s) are configured to be proportional, i.e., balanced, across a plurality of storage elements 112a, 112b, 112c, ..., and/or 112m.

Thus, balancer 114 is configured to balance energy drawn from storage elements 112a, 112b, 112c, ..., 112m and/or sources 104a, 104b, 104c, ..., 104m as current is drawn from one or more of the balancer output ports (s) 119a, 119b, ..., 119n. When sources 104a, 104b, 104c, ..., 104m correspond to unconventional power sources, balancer 114 may generally incur a relatively smaller conversion loss compared to a voltage regulator (and/or DC-to-DC-converter) configured to convert a single conventional input voltage (e.g., 12 volts) to a plurality of relatively low output voltages. Thus, balancer 114 may be relatively small in size and may be relatively efficient.

Balancer 114 output ports 119a, 119b, ..., 119n may each be coupled to a respective output stage 116a, 116b, ..., 116n. A number output stages 116a, 116b, ..., 116n corresponds to a number of taps 118a, 118b, ..., 118n of power device 102. In an embodiment, each output stage 116a, 116b, ..., 116n may include and/or may correspond to a pass gate. A pass gate, e.g., a switch, is configured to controllably couple and/or decouple an input and an output. For example, a pass gate may include, but is not limited to, a transistor (e.g., field effect transistor (FET), bipolar junction transistor (BJT), insulated gate bipolar transistor (IGBT), etc.), a relay, etc. Thus, each pass gate 116a, 116b, ..., 116n may controllably couple or decouple a respective balancer output 119a, 119b, ..., or 119n and an associated power device output tap 118a, 118b, ..., or 118n.

Each pass gate may be controlled by control logic 110. For example, control logic 110 may be configured to control a selected pass gate to decouple a selected balancer output port 119a, 119b, ..., or 119n from an associated power device tap 118a, 118b, ..., or 118n in response to a signal from PMU 132. The signal may be configured to indicate that a load 130a, 130b, ..., or 130p is no longer operational, i.e., should not be drawing power. In another example, control logic 110 may be configured to sense an output (e.g., voltage and/or current) of a selected output stage 116a, 116b, ..., or 116n and to control an associated pass gate to decouple the associated balancer output port 119a, 119b, ..., or 119n from the associated power device tap 118a, 118b, ..., or 118n if the output voltage and/or current is below a first threshold or above a second threshold. For example, the first threshold may correspond to a low power state and the second threshold may correspond to a fault state.

In another embodiment, one of more of the output stage(s) 116a, 116b, ..., and/or 116n, e.g., output stage 116b, may include a voltage regulator configured to provide a target output voltage to an associated tap, e.g., output voltage Vout2 to power device tap 118b. The target output voltage may correspond to an operating voltage of a specific load, e.g. load 130b. The voltage regulator may include, but is not limited to, a linear voltage regulator, a low drop out (LDO) voltage regulator, a switched capacitor voltage regulator, a buck voltage regulator, etc. LDO voltage regulators are configured to operate with a relatively small difference between an input voltage and associated output voltage. Linear voltage regulators generally include a transistor operating in a linear region and may be used when there is a relatively small difference between an input voltage and associated output voltage. Operating characteristics of LDO regulators include a relatively low minimum operating voltage, a relatively higher efficiency and a relatively low heat dissipation compared to other types of voltage regulators. For example, linear regulator(s) and/or LDO voltage regulator(s) may be used in one or more of output stage(s) 116a, 116b, . . . , and/or 116n when associated source(s) are relatively low voltage, i.e., correspond to unconventional source(s).

Thus, a multisource power delivery system, consistent with the present disclosure may include a plurality of power sources, conventional and/or unconventional, and a power device that includes a balancer and a plurality of storage elements. The power device is configured to receive energy from the plurality of sources and to store energy from each source in a respective storage element. The plurality of storage elements may be coupled to each other in series and each storage element may be coupled to the balancer. The balancer is configured to balance energy drawn from each of one or more of the storage elements. The power device is configured to provide a plurality of balanced output voltages to a plurality of taps. One or more of the output voltage(s) may correspond to a sum of a plurality of source voltages. One or more of the taps may then be coupled to one or more loads included in a load device. A number of taps may be less than or equal to a number of storage devices. The output voltages at the taps may be in or near an operating voltage range of one or more of the load(s).

Figure 2:
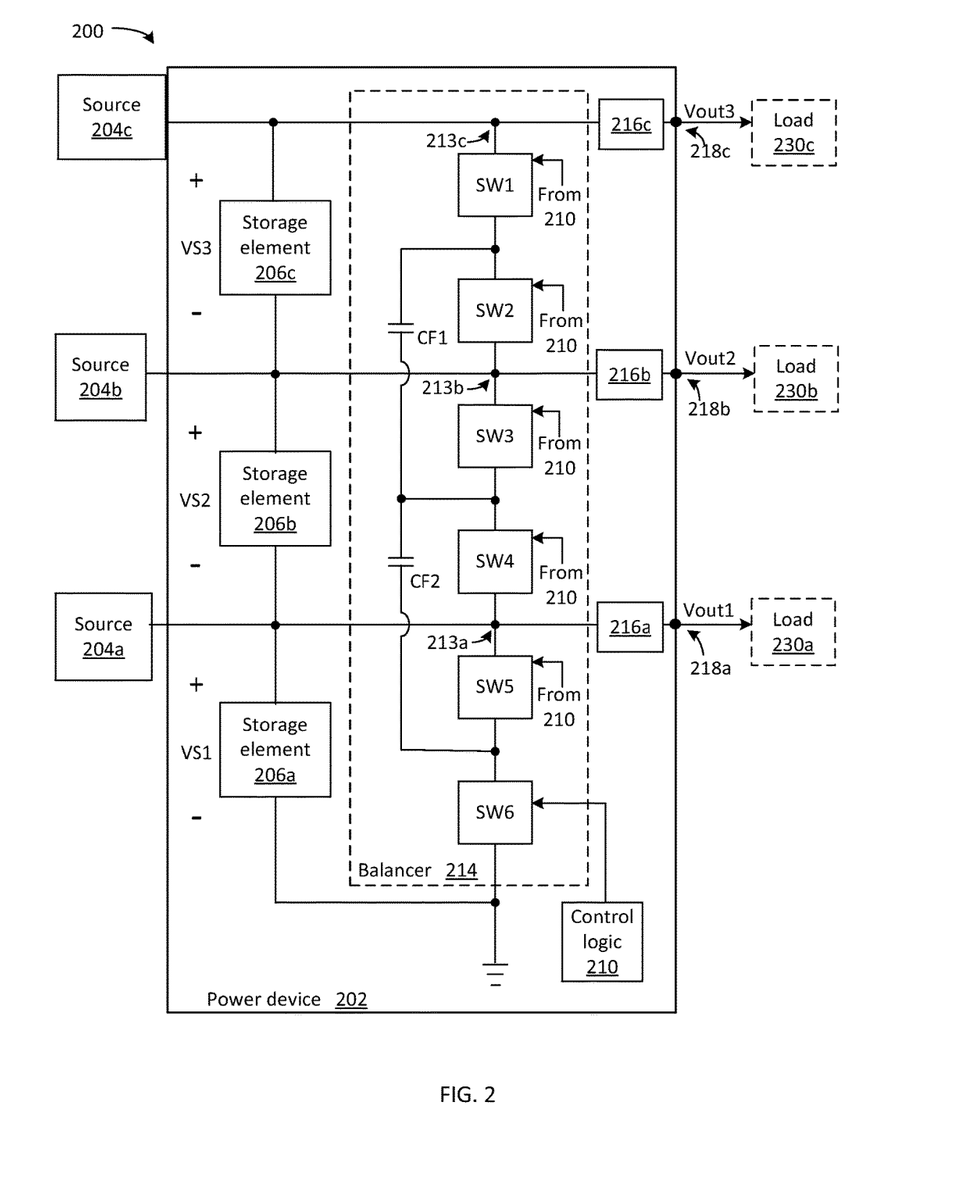
FIG. 2 illustrates an example multisource power delivery system including a three-level balancer, consistent with one embodiment of the present disclosure.

FIG. 2 illustrates an example multisource power delivery system 200, consistent with one embodiment of the present disclosure. Example 200 includes a power device 202, three sources 204a, 204b, 204c and three loads 230a, 230b, 230c. Power device 202 is one example of power device 102 of FIG. 1.

Power device 202 is coupled to the three sources 204a, 204b, 204c. Power device 202 may be coupled to one or more load(s) 230a, 230b and/or 230c at taps 218a, 218b, 218c. Power device 202 includes three storage elements 206a, 206b, 206c, control logic 210, a balancer 214 and three output stages 216a, 216b, 216c. Storage elements 206a, 206b, 206c are examples of storage elements 112a, 112b, 112c, . . . , 112m, control logic 210 is an example of control logic 110, balancer 214 is an example of balancer 114 and output stages 216a, 216b, 216c are examples of output stages 116a, 116b, . . . , 116n, all of FIG. 1. Each storage element 206a, 206b, 206c is configured to receive energy from a respective source 204a, 204b, 204c (e.g., input voltages VS1, VS2, VS3). Power device 202 is further configured to provide energy (e.g., output voltages Vout1, Vout2, Vout3) to one or more load(s) 230a, 230b, 230c via taps 218a, 218b, 218c. In this example 200, a number of taps 218a, 218b, 218c is equal to a number of sources 204a, 204b, 204c. In another example related to this example 200, the number of taps may be less than the number of sources. For example, taps 218a and 218c may be included and tap 218b may be omitted.

Balancer 214 is configured to receive energy from sources 204a, 204b, 204c and/or storage elements 206a, 206b, 206c at nodes 213a, 213b, 213c. Each node 213a, 213b, 213c may be further coupled to an input of a respective output stage 216a, 216b, 216c and an output of each output stage 216a, 216b, 216c may be coupled to a respective tap 218a, 218b, 218c.

Balancer 214 is further configured to balance the energy drawn from each storage element 206a, 206b, 206c and/or associated source 204a, 204b, 204c by one or more load(s) 230a, 230b, 230c, as described herein. In another example related to this example 200, if the number of taps is less than the number of sources, balancer 214 may include fewer elements. For example, if taps 218b and 218c are included and tap 218a is omitted, balancer 214 may be configured to balance only the voltage associated with taps 218b and 218c.

Balancer 214 is an example of a switched capacitor voltage regulator balancer and includes six switches SW1, SW2, . . . , SW6 and two flying (i.e., floating) capacitors CF1, CF2. Switches SW1, SW2, . . . , SW6 may include, but are not limited to, transistors (e.g., FETs, BJTs), relays, etc. A first terminal of switch SW6 is coupled to ground, a second terminal of switch SW6 is coupled to a first terminal of adjacent switch SW5, a second terminal of switch SW5 is coupled to a first terminal of adjacent switch SW4 at node 213a, a second terminal of switch SW4 is coupled to a first terminal of adjacent switch SW3, a second terminal of switch SW3 is coupled to a first terminal of adjacent switch SW2 at node 213b, a second terminal of switch SW2 is coupled to a first terminal of adjacent switch SW1 and a second terminal of switch SW1 is coupled to node 213c. A first terminal of flying capacitor CF2 is coupled to the second terminal of SW6 and the first terminal of SW5, a second terminal of flying capacitor CF2 is coupled to the second terminal of SW4, the first terminal of SW3 and a first terminal of flying capacitor CF1. A second terminal of flying capacitor CF1 is coupled to the second terminal of SW2 and the first terminal of SW1.

Switches SW1, SW2, . . . , SW6 are configured to receive inputs (e.g., PWM signal) from control logic 210 at respective third switch terminals. For example, if storage elements 206a, 206b, 206c and associated sources 204a, 204b, 204c are configured as stacks (i.e., VS1=VS2=VS3), then control logic 210 may be configured to provide a PWM signal with 33% duty cycle to switches SW1, SW2, . . . , SW6. In other words, for a system that includes m sources and VS1=VS2= . . . =VSm (i.e., an m-stack), a PWM signal duty cycle may be 1/m.

Continuing with this example, switches SW1, SW3 and SW5 may be ON and switches SW2, SW4 and SW6 may be OFF for one-half of a period of the PWM signal and switches SW1, SW3 and SW5 may be OFF and switches SW2, SW4 and SW6 ON for the other half of the period of the PWM signal. In another example, if the sources 204a, 204b, 204c are not configured as stacks, the duty cycle may not be 50%. Balancer 214 may thus be configured to balance the energy drawn from each storage element 206a, 206b, 206c and may thus maintain relative values of voltages provided to output stages 216a, 216b, 216c, as described herein. For output stages 216a, 216b, 216c that are pass gates, the voltages provided to the output stages may correspond to Vout1, Vout2, Vout3, respectively.

Figure 3:
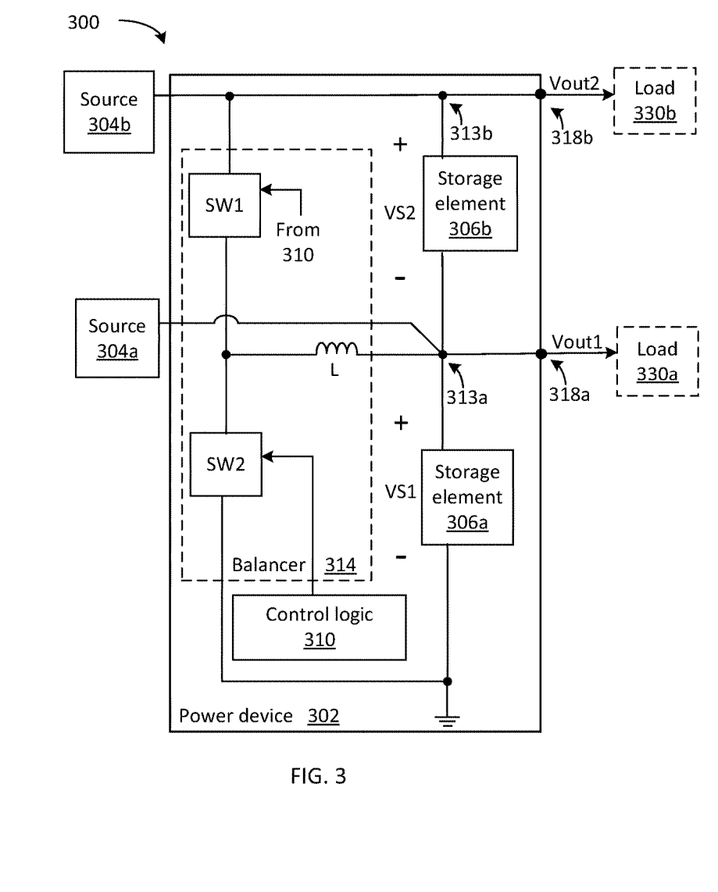
FIG. 3 illustrates another example multisource power delivery system including a two-level balancer, consistent with one embodiment of the present disclosure.

FIG. 3 illustrates an example multisource power delivery system 300, consistent with one embodiment of the present disclosure. Example 300 is simplified for ease of description, for example, output stage(s) are not shown in this example 300. Example 300 includes a power device 302, two sources 304a, 304b and two loads 330a, 330b. Power device 302 is one example of power device 102 of FIG. 1.

Power device 302 is coupled to the two sources 304a, 304b. Power device 302 may be coupled to one or more load(s) 330a and/or 330b at taps 318a, 318b. Power device 302 includes two storage elements 306a, 306b, control logic 310 and a balancer 314. Storage elements 306a, 306b are examples of storage elements 112a, 112b, 112c, . . . , 112m, control logic 310 is an example of control logic 110 and balancer 314 is an example of balancer 114, all of FIG. 1. Each storage element 306a, 306b is configured to receive energy from a respective source 304a, 304b. Power device 302 is further configured to provide energy (e.g., output voltages Vout1, Vout2) to one or more load(s) 330a, 330b via taps 318a, 318b. In this example 300, a number of taps 318a, 318b is equal to a number of sources 304a, 304b.

Balancer 314 is configured to receive energy from sources 304a, 304b and/or storage elements 306a, 306b at nodes 313a, 313b. Balancer 314 is further configured to balance the energy drawn from each storage element 306a, 306b and/or associated source 304a, 304b by one or more load(s) 330a, 330b, as described herein.

Balancer 314 is an example of a buck voltage regulator balancer and includes two switches SW1, SW2 and an inductor L. Switches SW1, SW2 may include, but are not limited to, transistors (e.g., FETs, BJTs), relays, etc. A first terminal of switch SW1 is coupled to ground, a second terminal of switch SW1 is coupled to a first terminal of switch SW2 and a first terminal of inductor L. A second terminal of inductor L is coupled to node 313a and a second terminal of switch SW2 is coupled to node 313b. Each node 313a, 313b is further coupled to a respective tap 318a, 318b.

Switches SW1 and SW2 are configured to receive inputs (e.g., PWM signal) from control logic 310 at respective third switch terminals. For example, if storage elements 306a, 306b and associated sources 304a, 304b are configured as stacks (i.e., VS1=VS2), then control logic 310 may be configured to provide a PWM signal with 50% duty cycle to switches SW1 and SW2. Continuing with this example, switch SW1 may be ON and switch SW2 may be OFF for one-half of a period of the PWM signal and switch SW1 may be OFF and switch SW2 ON for the other half of the period of the PWM signal. In another example, if the sources 304a, 304b are not configured as stacks, the duty cycle may not be 50%. Balancer 314 may thus be configured to balance the energy drawn from each storage element 306a, 306b and may thus maintain relative values of Vout1 and Vout2, as described herein.

Thus, a multisource power delivery system consistent with the present disclosure may include a plurality of sources and associated storage elements and a balancer configured to balance energy drawn from each storage element. A balancer may include a voltage regulator, as described herein. A number of output taps on a power device may be less than or equal to a number of storage elements.

Figure 4:
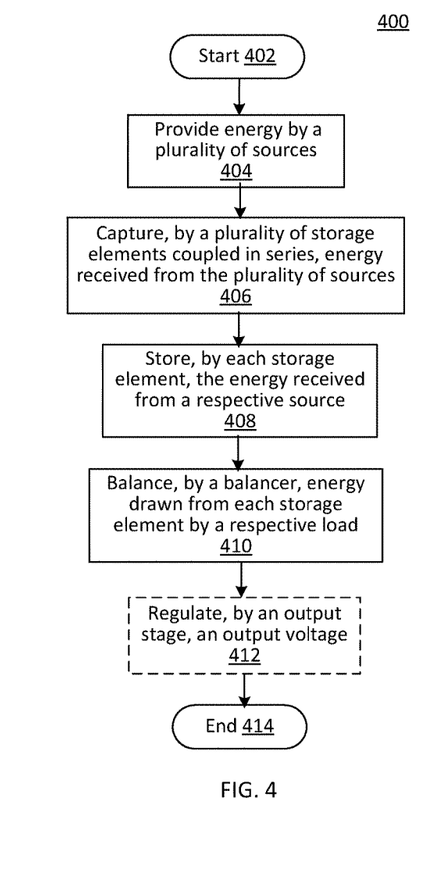
FIG. 4 is a flowchart of power delivery operations according to various embodiments of the present disclosure.

FIG. 4 is a flowchart 400 of power delivery operations according to various embodiments of the present disclosure. In particular, the flowchart 400 illustrates capturing energy received from a plurality of sources and providing balanced output voltage(s) to a plurality of loads. The operations may be performed, for example, by power device 102 and/or sources 104a, 104b, 104c, . . . , 104m of FIG. 1.

Operations of this embodiment may begin with start 402. Operation 404 may include providing energy by a plurality of sources. For example, the sources may include unconventional and/or conventional power sources, as described herein. Operation 406 includes capturing, by a plurality of storage elements coupled in series, energy received from the plurality of sources. The storage elements may include one or more of batteries and/or capacitors. Operation 408 includes storing, by each storage element, the energy received from a respective source. Operation 410 includes balancing, by a balancer coupled to the plurality of storage elements, energy drawn from each storage element by a respective load. For example, the balancer may include one or more voltage regulators. Operation 412 may include regulating, by an output stage, an output voltage. For example, the output voltage may be related to a balancer output and/or source input voltage. Operations of this embodiment may then end 414.

Thus, power may be received from a plurality of power sources, conventional and/or unconventional. Energy from each source may be stored in a respective storage element and a balancer may balance energy drawn from each storage element by a respective load.

While the flowchart of FIG. 4 illustrates operations according various embodiments, it is to be understood that not all of the operations depicted in FIG. 4 are necessary for other embodiments. In addition, it is fully contemplated herein that in other embodiments of the present disclosure, the operations depicted in FIG. 4, and/or other operations described herein may be combined in a manner not specifically shown in any of the drawings, and such embodiments may include less or more operations than are illustrated in FIG. 4. Thus, claims directed to features and/or operations that are not exactly shown in one drawing are deemed within the scope and content of the present disclosure.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

USB (Universal serial bus) may comply or be compatible with Universal Serial Bus Specification, Revision 2.0, published by the Universal Serial Bus organization, Apr. 27, 2000, and/or later versions of this specification, for example, Universal Serial Bus Specification, Revision 3.1, published Jul. 26, 2013.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Thus, consistent with the teachings of the present disclosure, a system and method are configured to receive energy from a plurality of sources, conventional and/or unconventional, to store energy from each source in a respective storage element and to provide a plurality of output voltages to a plurality of taps. One or more of the taps may then be coupled to a load device. The system and method are further configured to balance energy drawn from each storage element by a respective load.

EXAMPLES

Examples of the present disclosure include subject material such as a method, means for performing acts of the method, a device, or of an apparatus or system related to a multisource power delivery system, as discussed below.

Example 1

According to this example there is provided an apparatus. The apparatus includes a plurality of storage elements coupled in series, the storage elements to capture and store energy received from a plurality of sources; and a balancer coupled to the plurality of storage elements, the balancer to balance energy drawn from each storage element.

Example 2

This example includes the elements of example 1, further including control logic coupled to the balancer, the control logic to control operation of the balancer.

Example 3

This example includes the elements of example 1, further including a plurality of output stages, each output stage coupled to a respective balancer output port and at least one of: each output stage includes a pass gate and/or at least one output stage includes a voltage regulator.

Example 4

This example includes the elements of example 1, wherein each storage element includes at least one of a battery and/or a capacitor.

Example 5

This example includes the elements of example 1, further including a plurality of taps, each tap to couple to a respective load.

Example 6

This example includes the elements according to any one of examples 1 to 5, wherein the balancer includes at least one of a switched capacitor voltage regulator, a buck voltage regulator and/or a buck-boost voltage regulator.

Example 7

This example includes the elements according to any one of examples 1 to 5, wherein the balancer includes at least one voltage regulator.

Example 8

This example includes the elements of example 7, wherein at least one voltage regulator of the at least one voltage regulator is to operate open loop.

Example 9

This example includes the elements of example 7, wherein at least one voltage regulator of the at least one voltage regulator is to operate closed loop.

Example 10

This example includes the elements according to any one of examples 1 to 5, wherein the balancer includes a plurality of voltage regulators and a first voltage regulator is to operate open loop and a second voltage regulator is to operate closed loop.

Example 11

This example includes the elements of example 4, wherein the capacitor is a supercapacitor.

Example 12

This example includes the elements of example 4, wherein the battery is a rechargeable battery type selected from the group including Li-ion (Lithium Ion), NiMH (Nickel-Metal Hydride), NiZn (Nickel-Zinc) and NiCd (Nickel-Cadmium).

Example 13

This example includes the elements according to any one of examples 1 to 5, wherein at least one storage element includes at least one battery and at least one supercapacitor.

Example 14

This example includes the elements of example 13, wherein the at least one battery and at least one supercapacitor are coupled at least one of in series and in parallel.

Example 15

This example includes the elements according to any one of examples 1 to 5, wherein an output voltage of a storage element is equal to a respective output voltage of each other storage element.

Example 16

This example includes the elements according to any one of examples 1 to 5, wherein respective output voltages of at least some storage elements are equal.

Example 17

This example includes the elements of example 5, wherein a number of taps equals a number of storage elements.

Example 18

This example includes the elements of example 5, wherein a number of taps is less than a number of storage elements.

Example 19

This example includes the elements of example 2, wherein the balancer includes a plurality of switches and at least one flying capacitor, the switches to receive a pulse width modulated (PWM) signal from the control logic, the switches controlled closed loop.

Example 20

This example includes the elements according to any one of examples 1 to 5, wherein the balancer includes a plurality of switches and an inductor, the switches to receive a pulse width modulated (PWM) signal, the switches controlled open loop.

Example 21

This example includes the elements of example 2, wherein the control logic is to receive a control signal from a load device related to an output voltage.

Example 22

This example includes the elements according to any one of examples 1 to 5, wherein each of at least some of the plurality of storage elements corresponds to a stack.

Example 23

This example includes the elements according to any one of examples 1 to 5, wherein the balancer is to receive energy from a conventional source.

Example 24

This example includes the elements of example 3, wherein each output stage includes a pass gate, each pass gate selected from the group including a field effect transistor (FET), a bipolar junction transistor (BJT), an insulated gate bipolar transistor (IGBT) and a relay.

Example 25

This example includes the elements of example 3, wherein each output stage includes a voltage regulator, each voltage regulator selected from the group including a linear voltage regulator, a low drop out (LDO) voltage regulator, a switched capacitor voltage regulator and a buck voltage regulator.

Example 26

This example includes the elements of example 3, wherein a respective output voltage associated with each balancer output port corresponds to a voltage across one storage element or a sum of voltages across a plurality of storage elements.

Example 27

This example includes the elements of example 3, wherein a number of balancer output ports is less than or equal to a number of storage elements.

Example 28

This example includes the elements of example 3, wherein each pass gate is to controllably decouple the respective balancer output port from an associated power device tap.

Example 29

This example includes the elements of example 3, wherein each output stage voltage regulator is provide a respective target output voltage to an associated power device tap.

Example 30

According to this example there is provided a method. The method includes capturing, by a plurality of storage elements coupled in series, energy received from a plurality of sources; storing, by each storage element, the energy received from a respective source; and balancing, by a balancer coupled to the plurality of storage elements, energy drawn from each storage element.

Example 31

This example includes the elements of example 30, further including controlling, by control logic, operation of the balancer.

Example 32

This example includes the elements of example 30, further including controlling, by each of a plurality of output stages, a respective output of the balancer.

Example 33

This example includes the elements of example 30, wherein each storage element includes at least one of a battery and a capacitor.

Example 34

This example includes the elements of example 30, further including coupling, by each of a plurality of taps, an output of a power device to a respective load.

Example 35

This example includes the elements of example 30, wherein the balancer includes at least one of a switched capacitor voltage regulator, a buck voltage regulator and/or a buck-boost voltage regulator.

Example 36

This example includes the elements of example 30, further including providing, by a plurality of sources, the energy.

Example 37

This example includes the elements of example 31, wherein the controlling includes regulating a voltage.

Example 38

This example includes the elements of example 32, wherein at least one output stage includes a voltage regulator.

Example 39

This example includes the elements of example 30, wherein the plurality of sources includes at least one unconventional power source.

Example 40

This example includes the elements of example 30, wherein the balancer includes at least one voltage regulator.

Example 41

This example includes the elements of example 40, further including, operating, by at least one voltage regulator of the at least one voltage regulator, closed loop.

Example 42

This example includes the elements of example 30, wherein the balancer includes a plurality of voltage regulators and further including operating, by a first voltage regulator, open loop and operating, by a second voltage regulator, closed loop.

Example 43

This example includes the elements of example 33, wherein the capacitor is a supercapacitor.

Example 44

This example includes the elements of example 33, wherein the battery is a rechargeable battery type selected from the group including Li-ion (Lithium Ion), NiMH (Nickel-Metal Hydride), NiZn (Nickel-Zinc) and NiCd (Nickel-Cadmium).

Example 45

This example includes the elements of example 30, wherein at least one storage element includes at least one battery and at least one supercapacitor.

Example 46

This example includes the elements of example 45, wherein the at least one battery and at least one supercapacitor are coupled at least one of in series and in parallel.

Example 47

This example includes the elements of example 30, wherein an output voltage of a storage element is equal to a respective output voltage of each other storage element.

Example 48

This example includes the elements of example 30, wherein respective output voltages of at least some storage elements are equal.

Example 49

This example includes the elements of example 34, wherein a number of taps equals a number of storage elements.

Example 50

This example includes the elements of example 34, wherein a number of taps is less than a number of storage elements.

Example 51

This example includes the elements of example 31, wherein the balancer includes a plurality of switches and at least one flying capacitor, and further including receiving, by the switches, a pulse width modulated (PWM) signal from the control logic and controlling, by the control logic, the switches closed loop.

Example 52

This example includes the elements of example 30, wherein the balancer includes a plurality of switches and an inductor, and further including receiving, by the switches, a pulse width modulated (PWM) signal and controlling, by control logic, the switches open loop.

Example 53

This example includes the elements example 31, further including, receiving, by the control logic, a control signal from a load device related to an output voltage.

Example 54

This example includes the elements of example 53, wherein the control signal is related to at least one of changes in and/or anticipated energy consumption of the load device.

Example 55

This example includes the elements of example 31, further including managing, by the control logic, operations of the power device.

Example 56

This example includes the elements of example 30, wherein each of at least some of the plurality of storage elements corresponds to a stack.

Example 57

This example includes the elements of example 30, further including receiving energy, by the power device, from a conventional source.

Example 58

This example includes the elements of example 57, wherein the conventional source is selected from the group including an AC (alternating current)/DC (direct current) converter and a USB (Universal Serial Bus) port.

Example 59

This example includes the elements of example 32, wherein the controlling includes controllably decoupling, by a respective pass gate, each balancer output port from a respective power device tap, each pass gate selected from the group including a field effect transistor (FET), a bipolar junction transistor (BJT), an insulated gate bipolar transistor (IGBT) and a relay.

Example 60

This example includes the elements of example 32, wherein the controlling includes regulating, by a respective voltage regulator, an output voltage from each balancer output port, each voltage regulator selected from the group including a linear voltage regulator, a low drop out (LDO) voltage regulator, a switched capacitor voltage regulator and a buck voltage regulator.

Example 61

This example includes the elements of example 30, wherein each of the plurality of sources is selected from the group including solar cells, photovoltaic cells, wireless power sources, piezoelectric sources and thermoelectric sources.

Example 62

This example includes the elements of example 30, wherein each of at least some of the plurality of sources corresponds to a stack.

Example 63

This example includes the elements of example 30, further including providing, by at least some of the plurality of sources, energy at respective voltages on the order of ones of volts or tenths of a volt.

Example 64

This example includes the elements of example 30, wherein each source is coupled in parallel with a respective storage element.

Example 65

This example includes the elements of example 30, further including receiving, by the balancer, energy from at least one of the plurality of sources.

Example 66

This example includes the elements of example 32, wherein a respective output voltage associated with each balancer output port corresponds to a voltage across one storage element or a sum of voltages across a plurality of storage elements.

Example 67

This example includes the elements of example 32, wherein a number of balancer output ports is less than or equal to a number of storage elements.

Example 68

This example includes the elements of example 32, further including providing, by each output stage voltage regulator, a respective target output voltage to an associated power device tap.

Example 69

According to this example there is provided a system. The system includes a plurality of sources; and a power device coupled to the plurality of sources. The power device includes a plurality of storage elements coupled in series, each storage element to capture and store energy received from a respective source, and a balancer coupled to the plurality of storage elements, the balancer to balance energy drawn from each storage element.

Example 70

This example includes the elements of example 69, wherein the power device further includes control logic coupled to the balancer, the control logic to control operation of the balancer.

Example 71

This example includes the elements of example 69, wherein the power device further includes a plurality of output stages, each output stage coupled to a respective balancer output port and at least one of: each output stage includes a pass gate and/or at least one output stage includes a voltage regulator.

Example 72

This example includes the elements of example 69, wherein each storage element includes at least one of a battery and/or a capacitor.

Example 73

This example includes the elements of example 69, wherein the power device further includes a plurality of taps, each tap to couple the power device to a respective load.

Example 74

This example includes the elements according to any one of examples 69 to 73, wherein the balancer includes at least one of a switched capacitor voltage regulator, a buck voltage regulator and/or a buck-boost voltage regulator.

Example 75

This example includes the elements of example 71, wherein at least one output stage includes a voltage regulator.

Example 76

This example includes the elements according to any one of examples 69 to 73, wherein the plurality of sources includes at least one unconventional power source.

Example 77

This example includes the elements according to any one of examples 69 to 73, wherein the balancer includes at least one voltage regulator.

Example 78

This example includes the elements of example 77, wherein at least one voltage regulator of the at least one voltage regulator is to operate closed loop.

Example 79

This example includes the elements according to any one of examples 69 to 73, wherein the balancer includes a plurality of voltage regulators and a first voltage regulator is to operate open loop and a second voltage regulator is to operate closed loop.

Example 80

This example includes the elements of example 72, wherein the capacitor is a supercapacitor.

Example 81

This example includes the elements of example 72, wherein the battery is a rechargeable battery type selected from the group including Li-ion (Lithium Ion), NiMH (Nickel-Metal Hydride), NiZn (Nickel-Zinc) and NiCd (Nickel-Cadmium).

Example 82

This example includes the elements according to any one of examples 69 to 73, wherein at least one storage element includes at least one battery and at least one supercapacitor.

Example 83

This example includes the elements of example 82, wherein the at least one battery and at least one supercapacitor are coupled at least one of in series and in parallel.

Example 84

This example includes the elements according to any one of examples 69 to 73, wherein an output voltage of a storage element is equal to a respective output voltage of each other storage element.

Example 85

This example includes the elements according to any one of examples 69 to 73, wherein respective output voltages of at least some storage elements are equal.

Example 86

This example includes the elements of example 73, wherein a number of taps equals a number of storage elements.

Example 87

This example includes the elements of example 73, wherein a number of taps is less than a number of storage elements.

Example 88

This example includes the elements of example 70, wherein the balancer includes a plurality of switches and at least one flying capacitor, the switches to receive a pulse width modulated (PWM) signal from the control logic, the switches controlled closed loop.

Example 89

This example includes the elements according to any one of examples 69 to 73, wherein the balancer includes a plurality of switches and an inductor, the switches to receive a pulse width modulated (PWM) signal, the switches controlled open loop.

Example 90

This example includes the elements of example 70, wherein the control logic is to receive a control signal from a load device related to an output voltage.

Example 91

This example includes the elements of example 90, wherein the control signal is related to at least one of changes in and/or anticipated energy consumption of the load device.

Example 92

This example includes the elements of example 70, wherein the control logic is further to manage operations of the power device.

Example 93

This example includes the elements according to any one of examples 69 to 73, wherein each of at least some of the plurality of storage elements corresponds to a stack.

Example 94

This example includes the elements according to any one of examples 69 to 73, further including a conventional source, the power device to receive energy from the conventional source.

Example 95

This example includes the elements of example 94, wherein the conventional source is selected from the group including an AC (alternating current)/DC (direct current) converter and a USB (Universal Serial Bus) port.

Example 96

This example includes the elements of example 71, wherein each output stage includes a pass gate, each pass gate selected from the group including a field effect transistor (FET), a bipolar junction transistor (BJT), an insulated gate bipolar transistor (IGBT) and a relay.

Example 97

This example includes the elements of example 71, wherein each output stage includes a voltage regulator, each voltage regulator selected from the group including a linear voltage regulator, a low drop out (LDO) voltage regulator, a switched capacitor voltage regulator and a buck voltage regulator.

Example 98

This example includes the elements according to any one of examples 69 to 73, wherein each of the plurality of sources is selected from the group including solar cells, photovoltaic cells, wireless power sources, piezoelectric sources and thermoelectric sources.

Example 99

This example includes the elements according to any one of examples 69 to 73, wherein each of at least some of the plurality of sources corresponds to a stack.

Example 100

This example includes the elements according to any one of examples 69 to 73, wherein at least some of the plurality of sources are to provide energy at respective voltages on the order of ones of volts or tenths of a volt.

Example 101

This example includes the elements according to any one of examples 69 to 73, wherein each source is coupled in parallel with a respective storage element.

Example 102

This example includes the elements according to any one of examples 69 to 73, wherein the balancer is to receive energy from at least one of the plurality of sources.

Example 103

This example includes the elements of example 71, wherein a respective output voltage associated with each balancer output port corresponds to a voltage across one storage element or a sum of voltages across a plurality of storage elements.

Example 104

This example includes the elements of example 71, wherein a number of balancer output ports is less than or equal to a number of storage elements.

Example 105

This example includes the elements of example 71, wherein each pass gate is to controllably decouple the respective balancer output port from an associated power device tap.

Example 106

This example includes the elements of example 71, wherein each output stage voltage regulator is to provide a respective target output voltage to an associated power device tap.

Example 107

Another example of the present disclosure is a system including at least one device arranged to perform the method of any one of examples 30 to 68.

Example 108

Another example of the present disclosure is a device including means to perform the method of any one of examples 30 to 68.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus comprising:
    a plurality of storage elements coupled in series, the storage elements to capture and store energy received from a plurality of sources;
    a balancer coupled to the plurality of storage elements to balance energy drawn from each storage element, wherein the balancer comprises at least one voltage regulator to operate in open loop, the at least one voltage regulator including at least one of a switched capacitor voltage regulator, a buck voltage regulator or a buck-boost voltage regulator;
    at least one output stage including a pass gate; and
    control logic coupled to the balancer and the at least one output stage, the control logic to receive a signal indicating at least anticipated energy consumption for a load device coupled to the apparatus, control the pass gate in the at least one output stage based on the anticipated energy consumption and control operation of the balancer by generating a pulse width modulated (PWM) signal to drive the balancer.

2. The apparatus of claim 1, wherein the at least one output stage comprises a plurality of output stages, each output stage coupled to a respective balancer output port.

3. The apparatus of claim 1, wherein each storage element comprises at least one of a battery and/or a capacitor.

4. The apparatus of claim 1, further comprising a plurality of taps, each tap to couple to a respective load.

5. The apparatus of claim 1 wherein said PWM signal has a duty cycle selected, at least in part, based on relative values of respective output voltages of said sources.

6. A method comprising:
    capturing, by a plurality of storage elements coupled in series, energy received from a plurality of sources;
    storing, by each storage element, the energy received from a respective source;
    balancing, by a balancer coupled to the plurality of storage elements, energy drawn from each storage element, wherein the balancer comprises at least one voltage regulator to operate in open loop, the at least one voltage regulator including at least one of a switched capacitor voltage regulator, a buck voltage regulator or a buck-boost voltage regulator;
    receiving, at control logic, a signal indicating at least anticipated energy consumption;
    controlling, by the control logic, a pass gate in at least one output stage based on the anticipated energy consumption; and
    controlling, by control logic, operation of the balancer by generating a pulse width modulated (PWM) signal to drive the balancer.

7. The method of claim 6, further comprising controlling, by each of a plurality of output stages, a respective output of the balancer.

8. The method of claim 6, wherein each storage element comprises at least one of a battery and a capacitor.

9. The method of claim 6, further comprising coupling, by each of a plurality of taps, an output of a power device to a respective load.

10. The method of claim 6, wherein the controlling comprises regulating a voltage.

11. The method of claim 6 wherein said receiving PWM signal comprises receiving a PWM signal having a duty cycle selected, at least in part, based on relative values of respective output voltages of said sources.

12. A system comprising:
a plurality of sources; and
a power device coupled to the plurality of sources, the power device comprising:
a plurality of storage elements coupled in series, each storage element to capture and store energy received from a respective source,
a balancer coupled to the plurality of storage elements to balance energy drawn from each storage element, wherein the balancer comprises at least one voltage regulator to operate in open loop, the at least one voltage regulator including at least one of a switched capacitor voltage regulator, a buck voltage regulator or a buck-boost voltage regulator;
at least one output stage including a pass gate; and
control logic coupled to the balancer and the at least one output stage, the control logic to receive a signal indicating at least anticipated energy consumption for a load device coupled to the apparatus, control the pass gate in the at least one output stage based on the anticipated energy consumption and control operation of the balancer by generating a pulse width modulated (PWM) signal to drive the balancer.

13. The system of claim 12, wherein the at least one output stage comprises a plurality of output stages, each output stage coupled to a respective balancer output port.

14. The system of claim 12, wherein each storage element comprises at least one of a battery and/or a capacitor.

15. The system of claim 12, wherein the power device further comprises a plurality of taps, each tap to couple the power device to a respective load.

16. The system of claim 12, wherein the plurality of sources comprises at least one unconventional power source comprising at least one of solar cells, photovoltaic cells, wireless power sources configured to capture and convert energy from antennas, piezoelectric sources configured to convert vibration into electrical energy, thermoelectric sources configured to convert heat flow across a temperature gradient into electrical energy.

17. The system of claim 12 wherein said PWM signal has a duty cycle selected, at least in part, based on relative values of respective output voltages of said sources.

* * * * *